H. VENNERS & G. H. JUDY.
Gas Carburetors.
No. 156,513.            Patented Nov. 3, 1874.
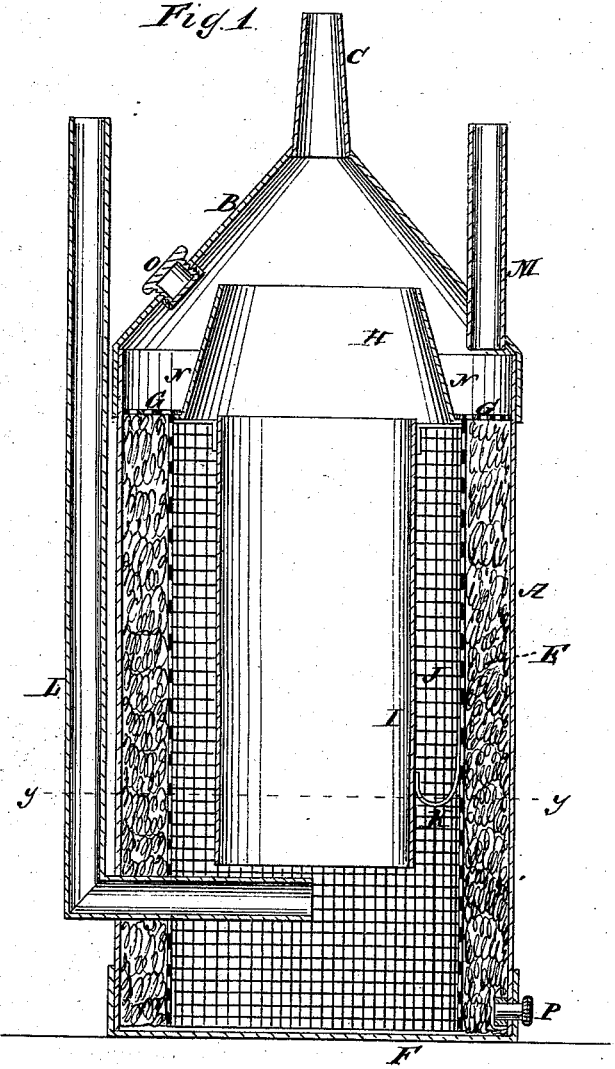
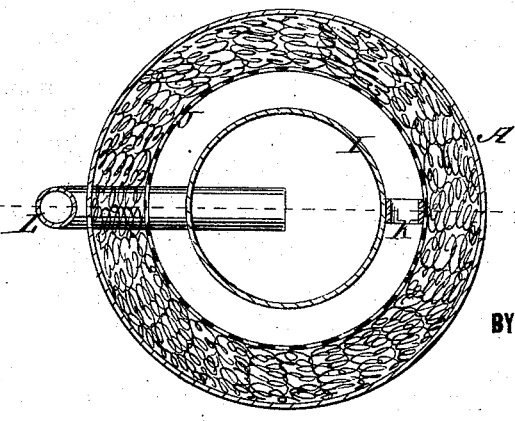

UNITED STATES PATENT OFFICE.

HARRY VENNERS AND GEORGE H. JUDY, OF CUMBERLAND, MARYLAND.

IMPROVEMENT IN GAS-CARBURETERS.

Specification forming part of Letters Patent No. 156,513, dated November 3, 1874; application filed September 26, 1874.

*To all whom it may concern:*

Be it known that we, HARRY VENNERS and GEORGE H. JUDY, of Cumberland, in the county of Alleghany and State of Maryland, have invented a new and useful Improvement in Gas-Carbureters, of which the following is a specification:

The invention is an improvement in the class of carbureters in which the gas is passed through fibrous or other absorbent material, saturated with a suitable carbureting-liquid. The improvement relates to the combination and arrangement of parts, whereby a part of the gas is passed in contact with the saturated fibrous material, which is exposed through the meshes of a woven-wire cylinder; also, whereby an annular trough or receptacle is formed above the chamber containing the absorbent material to receive and distribute the carbureting-liquid, all as hereinafter described.

In the accompanying drawing, Figure 1 is vertical section of the carbureter, taken on the line $x\ x$ of Fig. 2. Fig. 2 is a horizontal section of Fig. 1, taken on the line $y\ y$.

Similar letters of reference indicate corresponding parts.

A is the outer vessel, made preferably in cylindrical form, having a conical top, B, and central discharge-tube C at the apex of the cone. D is an interior woven-wire cylinder, open at both ends, placed in a central position in the vessel A, and is surrounded by the absorbent E, which, with the cylinder, extends from the bottom F to the perforated metallic annular covering G. H is a truncated cone, whose base spans the diameter of the wire cylinder D. The top end of this cone extends up into the conical top B. I is a cylinder of any suitable material, between which and the gauze cylinder D is an annular open space, J. This cylinder is suspended by hangers from the top of the cylinder D, and is confined in a central position by springs K, which bear against the cylinder D, as represented. This cylinder is open at both ends, and its upper end is flush with that of the cylinder D and the absorbent E. L is the pipe which conveys the gas from the meter to the carbureter. This pipe is on the outside but forms an elbow, which enters the carbureter just beneath the bottom of the interior cylinder I, and passing through the absorbent and the cylinder D, discharging the gas beneath into the interior. The benzine or other hydrocarbon liquid is introduced through the pipe M, and falls into the annular space N, and is strained through the annular perforated metal G, and is thus distributed evenly to the absorbent. O is a screw in the conical top B, which is opened while charging the feed-pipe M. P is a screw-cock, which, on its removal, allows water of condensation from the bottom of the corbureter to discharge. The pipes M and L are attached by "union joints," so that they may readily be detached.

This carbureter may be made of any desired material and of any size and shape. This carbureter may be used at the gas-works, so as to supply all the gas manufactured with an additional quantity of carbon. After the carbureter has been charged with the benzine or other liquid, which is held in suspension by the absorbent, a part of the gas passes up between the two cylinders and takes up the hydrocarbon vapor by contact with the absorbent material. The other part or current of the gas passes through the cylinder I, and the two concentrate and unite in the cones H and B. The illuminating power of the gas is thus greatly increased, and in such due proportion or degree that the hydrocarbon is fully economized.

Having thus described our invention, what we claim as new, and desire to secure by Letters Patent, is—

1. In a gas-carbureter, the combination of the imperforate casing or cylinder A, the smaller and concentric woven-wire cylinder D, the absorbent material, the short suspended open end cylinder I, cones H and B, and pipe L, arranged to discharge at the point indicated, all as shown and described.

2. In a gas-carbureter, the combination of the cylinder A and cone H, arranged to form an annular space or trough, N, the perforated plate G covering the annular receptacle for absorbent material, all as shown and described.

HARRY VENNERS.
GEORGE H. JUDY.

Witnesses:
T. F. M'CARDELL,
D. J. BRADLEY.